United States Patent
Pereira Alves Granado

(10) Patent No.: US 12,364,968 B2
(45) Date of Patent: Jul. 22, 2025

(54) METHOD FOR OBTAINING SUPERABSORBENT POLYMERS VIA ALKALINE HYDROLYSIS WITH PRESSURIZED WATER VAPOUR, USING POLYACRYLONITRILE AND ACRYLIC FIBRES AND FABRICS

(71) Applicant: INSTITUTO GRANADO DE TECNOLOGIA DA POLIACRILONITRILA LTDA, Jacarei (BR)

(72) Inventor: Nilton Pereira Alves Granado, Sao Jose dos Campos (BR)

(73) Assignees: INSTITUTO GRANADO DE TECNOLOGIA DA POLIACRILONTIRILA LTDA, Jacarei (BR); POLIACRILONITRILA LTDA, Jacarei (BR)

( * ) Notice: Subject to any disclaimer, the term of this patent is extended or adjusted under 35 U.S.C. 154(b) by 572 days.

(21) Appl. No.: 17/907,153

(22) PCT Filed: Apr. 30, 2021

(86) PCT No.: PCT/BR2021/050183
§ 371 (c)(1),
(2) Date: Sep. 23, 2022

(87) PCT Pub. No.: WO2021/195736
PCT Pub. Date: Oct. 7, 2021

(65) Prior Publication Data
US 2023/0108608 A1 Apr. 6, 2023

(30) Foreign Application Priority Data
Apr. 1, 2020 (BR) .......................... 102020006578-5

(51) Int. Cl.
B01J 20/26 (2006.01)
B01J 20/30 (2006.01)
(Continued)

(52) U.S. Cl.
CPC ........... B01J 20/265 (2013.01); B01J 20/261 (2013.01); B01J 20/3021 (2013.01); C08F 8/12 (2013.01);
(Continued)

(58) Field of Classification Search
CPC .... B01J 20/261; B01J 20/265; B01J 20/3021; B01J 2220/68; B29B 17/03; C08F 8/12;
(Continued)

(56) References Cited

U.S. PATENT DOCUMENTS

| | | | |
|---|---|---|---|
| 3,661,815 A | 5/1972 | Smith | |
| 3,935,099 A | 1/1976 | Weaver et al. | |

(Continued)

FOREIGN PATENT DOCUMENTS

| | | |
|---|---|---|
| CA | 2790574 A1 | 9/2011 |
| CN | 101717458 A | 6/2010 |

(Continued)

OTHER PUBLICATIONS

International Search Report for Corresponding International Application No. PCT/BR2021/050183, Jun. 12, 2021, 4 pages.

*Primary Examiner* — Brian A McCaig
(74) *Attorney, Agent, or Firm* — LUCAS & MERCANTI, LLP

(57) ABSTRACT

A method for producing superabsorbent polymers from polyacrylonitrile (PAN) virgin or recycled from acrylic fibre manufacturing waste and discarded fabrics subjecting the PAN to alkaline hydrolysis with pressurized water vapour of up to 5 kgf/cm² and a PAN:OH⁻ molar ratio of 1:0.5 to 0.95, to obtain a cross-linked poly(acrylic acid-co-acrylamide)

(Continued)

salt without using mechanical agitation, graphitizing agents with starch or cross-linking agents, and without precipitating the superabsorbent polymer obtained from the reaction medium with solvents or through pH adjustment with acids, the polymer obtained with recycled PAN leaves the autoclave already having a moisture content of 20% to 35% and a swelling capacity of >150 g $H_2O$/g.

14 Claims, 5 Drawing Sheets

(51) Int. Cl.
 *C08F 8/12* (2006.01)
 *C08F 20/44* (2006.01)
 *C08J 11/14* (2006.01)
 *C08K 3/22* (2006.01)

(52) U.S. Cl.
 CPC ............... *C08F 20/44* (2013.01); *C08J 11/14* (2013.01); *C08K 3/22* (2013.01); *B01J 2220/68* (2013.01); *C08K 2003/2203* (2013.01)

(58) Field of Classification Search
 CPC . C08F 20/44; C08F 120/44; C08J 3/03; C08J 11/04; C08J 11/14; C08J 2333/20; Y02W 30/62; D04H 1/43
 See application file for complete search history.

(56) References Cited

U.S. PATENT DOCUMENTS

| | | |
|---|---|---|
| 3,985,616 A | 10/1976 | Weaver et al. |
| 3,997,484 A | 12/1976 | Weaver et al. |
| 5,002,814 A | 3/1991 | Knack et al. |
| 5,496,890 A | 3/1996 | Sackmann et al. |
| 5,728,774 A | 3/1998 | Sackmann et al. |
| 6,156,848 A | 12/2000 | Sackmann et al. |
| 6,232,406 B1 * | 5/2001 | Stoy .................. C08F 8/12 525/329.2 |
| 6,288,158 B1 | 9/2001 | Schapowalov et al. |
| 6,573,358 B2 | 6/2003 | Michels et al. |
| 6,590,040 B2 | 7/2003 | Sackmann et al. |
| 6,639,022 B2 | 10/2003 | Michels et al. |
| 9,869,059 B2 | 1/2018 | Sealey et al. |
| 2001/0044501 A1 | 11/2001 | Michels et al. |
| 2001/0047060 A1 | 11/2001 | Michels et al. |
| 2002/0128396 A1 | 9/2002 | Sackmann et al. |

FOREIGN PATENT DOCUMENTS

| | | |
|---|---|---|
| EP | 0146190 B1 | 3/1989 |
| WO | 0123438 A1 | 4/2001 |

* cited by examiner

METHOD FOR OBTAINING SUPERABSORBENT POLYMERS VIA ALKALINE HYDROLYSIS WITH PRESSURIZED WATER VAPOUR, USING POLYACRYLONITRILE AND ACRYLIC FIBRES AND FABRICS

CROSS REFERENCE TO RELATED APPLICATION

This Application is a 371 of PCT/BR2021/050183 filed on Apr. 30, 2021 which, in turn, claimed the priority of Brazilian Patent Application No. BR 10 2020 006578-5 filed on Apr. 1, 2020, both applications are incorporated herein by reference.

FIELD OF THE INVENTION

The present invention aims to describe the process for producing superabsorbent polymers (SAPs), employing polyacrylonitrile (PAN) recycled from acrylic fibres and fabrics. In this way, it helps to solve a serious global problem, which is the disposal of textile polymers in the environment, transforming them into biodegradable substances that can be used to reduce irrigation water consumption and increase food production. It is characterized by the alkaline hydrolysis of PAN in the form of fibres or powder, with water vapour under pressure, without the use of grafting agents such as starch or external agents that form cross-links (cross-linkers). It is also not necessary to precipitate the polymer obtained in the process by adjusting the pH or using solvents, to be isolated from the reaction medium. Under the process conditions described in this invention, the superabsorbent polymer comes ready-made from the hydrolysis autoclave, and can be used as it is or be dried for milling, has a swelling capacity greater than 150 g $H_2O/g$, and is suitable for using as an irrigation and soil rainfall water retainer, in agricultural applications or in any application where SAPs are used.

BACKGROUND OF THE INVENTION

Synthetic polymers are used on a large scale in the world in all consumer segments and therefore their residues have serious consequences for the environment due to contamination of soil, rivers and oceans. The recycling of polymers can reduce their environmental impact, but it is still incipient, being restricted only to PET and PE and PP, used in the manufacture of plastic bottles and packaging. Other types of polymers of great consumption, such as PVC, PTFE, PS and ABS, are practically not recycled because they are difficult to separate and do not present satisfactory thermoplastic and physical properties in the final products to be obtained.

With regard to the polymers used in the production of synthetic fibres for the textile industry, practically nothing is recycled, with all the production of fabrics and clothes after their useful life, discarded in the environment with the generation of waste that takes decades or hundreds of years to degrade. The technological challenge for textile recycling is even greater when compared to packaging plastic recycling, since most fabrics are produced with yarns with a mixture of synthetic or natural fibres such as cotton, linen and wool. Specifically, the fibres obtained with the polyacrylonitrile (PAN) polymer, called acrylic fibres, which are the known synthetic fibres with properties most similar to wool, are produced in the world approximately 2 million tons per year. As the production of acrylic fibres has continued since the 1950s, started by Dupont in the United States of America, it is estimated that practically all this production is for replacement of fabrics that are discarded after approximately 5 years of use, meaning an annual environmental impact of million tons of fiber. It is known that acrylic fibres are very poorly biodegradable due to their high insolubility in water, low hydrophilicity, chemical inertness and resistance to ultraviolet (UV) rays, which can take more than 100 years to disintegrate in the soil.

Acrylic yarns currently produced, for the most part, are blends of acrylic fibres with cotton, viscose, polyamide, polyester or wool, and recycling technology is practically not known, either for the production of new fibres or for obtaining products using this feedstock. Reuse of recycled PAN in fiber production again is very unlikely, as they are dyed or pigmented with carbon black or titanium dioxide to make them opaque. Therefore, the best option for recycling acrylic fibres is the production of other by-products, which is addressed in this invention, such as superabsorbent polymers or SAPs.

DESCRIPTION OF THE STATE OF THE ART

Currently, the polymers used for producing hydrogels, also known as superabsorbent polymers (SAPs), are widely used in the area of personal care, mainly for the production of products for urine absorption (diapers) and feminine sanitary napkins. They also have increasing consumption in the agricultural area as soil water retainers, soil conditioners, as an additive in cement mortar for curing control, solidification of hospital and industrial waste, moisture control agent in fiber optic cables and a huge range of applications. The current production technology basically uses acrylic acid as a raw material, and its salts, sodium and potassium polyacrylates, are obtained by polymerizing this acid in the presence of cross-linking agents such as ethylene glycol dimethylacrylate (EGDMA), diethylene glycol diacrylate (DEGDA), allyl methacrylate, 1,1,1-trimethylolpropane triacrylate (TMPA), triallylamine and tetraallyloxyethane, divinylbenzene, mainly. Once the cross-linked polyacrylate copolymer is produced, it can absorb hundreds of times its own weight of water. The degree of swelling of existing products on the market is between 150 to 500 g of $H_2O$/g of polymer, which is much higher than the hydrophilic cotton which only absorbs about 20 g of $H_2O$/g.

With regard to the first superabsorbent polymers derived from polyacrylonitrile (PAN), these were patented in the 1970s by the United States Department of Agriculture and consisted of polyacrylonitrile grafted (grafted) with starch (starch-g-PAN), subjected to an alkaline hydrolysis process. This starch-grafted PAN was initially obtained by Kimura and Imoto and its synthesis is described in the article "Polymerization of acrylonitrile by ceric salts in the presence of starch", published in 1960 in Macromolecular Chemistry and Physics pages 140 to 150.

Employing starch-g-PAN, the United States Department of Agriculture patented the production process of these polymers and are described in U.S. Pat. Nos. 3,661,815, 3,935,099, 3,985,616, 3,997,484. Basically, all these patents describe the production of hydrogel-forming polymers with the following steps:

obtaining the graft copolymer from acrylonitrile monomer in an aqueous suspension of starch, employing free radical polymerization such as the persulfate/bisulfite redox system or ammonium ceric nitrate ($Ce^{4+}/Ce^{3+}$), separating the starch-grafted PAN copolymer (starch-g-PAN) from the unconverted monomer fraction and soluble salts by filtration and washing, thermal reacting (approximately 90° C.) the starch-g-PAN copolymer with a solution of a strong alkali such as sodium hydroxide or potassium hydroxide to produce the viscous solution of hydrolyzed starch-g-polyacrylonitrile (HSPAN), precipitating the HSPAN from the solution by adding an acid at approximately pH 3 or using a solvent such as acetone or ethanol, filtering the HSPAN and drying.

Under these conditions the polymers produced showed a degree of swelling with water from 100 to 2000 g/g and with 0.9% sodium chloride solution from 30 to 150 g/g. These patents describe several types of starches used such as corn, waxy corn, sorghum, wheat and tapioca.

U.S. Pat. No. 6,288,158 describes a process for producing hydrogel-forming polymers based on PAN, without using a grafting agent such as starch, but the polymer to be hydrolyzed is in the form of an emulsion with 20% to 30% of solids, alkaline hydrolysis occurs in an aqueous medium and uses aldehydes such as formaldehyde and glutaraldehyde as cross-linking agents.

On the other hand, U.S. Pat. No. 6,573,358 uses precipitated PAN obtained from suspension polymerization. As polymers obtained by suspension polymerization have relatively low molecular weights in the range of 50 to 300 kDa, to increase the molecular weight of the polymer, PAN is copolymerized with the cross-linking agent, diethylene glycol divinyl ether by free-radical process, using as a redox system persulfate-disulfite. After polymerization, the polymer was filtered, washed and dried. The hydrolysis was carried out in a reactor at approximately 100° C. for 4 hours using a 45% sodium hydroxide solution. After neutralization with an alcohol/water/acid mixture, the polymer was dried, ground and surface modified with a solution of glycerol, 2-propanediol and water, its water retention being 28.8.

U.S. Pat. No. 5,496,890 describes the production of SAP by the hydrolysis of a high molecular weight PAN copolymer obtained by emulsion, in a reactor with agitation at 95° C., using sodium hydroxide solution, neutralization with hydrochloric acid, precipitation with alcohol and heat treatment of the hydrolyzed PAN at 180° C. This same patent mentions that the polymer used in the manufacture of acrylic fibres, produced by Dralon (Germany), under the same hydrolysis conditions described, did not lead to the production of SAP, the product obtained being soluble in water. Similar SAP production processes employing PAN produced by emulsion, with hydrolysis in aqueous sodium hydroxide solution, followed by precipitation of the hydrolyzate with aliphatic alcohols such as methanol, ethanol, n-propanol, isopropanol, n-butanol and isobutanol or lactic and formic acids, are described respectively in U.S. Pat. No. 6,156,848 and US patent application 2001/0044501 A1.

Another patent application, WO 01/23438 A1, addresses a complex process of producing SAP, by the alkaline hydrolysis of PAN dissolved in thiocyanate solution, such as NaSCN, KCNS, LiCNS and Ca(CNS)$_2$, and using as catalysts Li, K and Na salts with anions of pKa>5, such as carbonate, cyanide, silicate and hydroxide. The precipitation of the cross-linked hydrolyzed PAN, already in the form of a hydrogel, occurred by using a 5% sodium chloride solution or citric acid.

Chinese patent CN 101717458 B from 2011 describes a PAN hydrolysis process employing only water under sub-critical pressure conditions at a temperature of 200° C. to 320° C. to produce an acrylic acid-co-acrylamide copolymer, that is not capable of forming hydrogel. Since the hydrolysis conditions are very aggressive, there is no cross-links formation or cross-linking of the polymer and at the same time it generates low molecular weight and water-soluble chains. The proportions of PAN/water used were from 1:4 to 1:20, with the molecular weight of the acrylic acid-co-acrylamide polymer decreasing with temperature and hydrolysis time. Very low molecular weight fractions, between 500 and 25.000 Daltons, are produced when using a temperature between 210° C. and 290° C. in 3 h of hydrolysis.

As can be seen above, most of the mentioned and known patents are based on PAN polymers, either grafted or with the addition of cross-linking agents and the alkaline hydrolysis is always carried out in dilute aqueous solution, usually in reactors with mechanical agitation, producing viscous hydrolysates in the form of salts that must be precipitated from solution, either by adjusting the pH between 3 and 4 or by employing solvents that decrease the solubility of hydrolyzed PAN (HPAN), such as ethanol and acetone. For obvious reasons, all the unit operations of the process for producing PAN, conducting the hydrolysis and removing the HPAN to obtain the cross-linked hydrogel-forming polymer, end up making the processes less economically competitive when compared to those that use acrylic acid as a raw material and that can be carried out continuously in a belt reactor. On the other hand, patents that describe the hydrolysis of PAN using only water under sub-critical pressure conditions do not allow the production of hydrogel-forming polymers, since the by-products obtained have a low molecular weight, are not cross-linked, in addition to using equipment not found for industrial applications due to the high working pressures involved.

Another question to be asked is that no reference from the state of the art reports the use of PAN obtained from recycling acrylic fibres as suitable for producing superabsorbent polymers with high swelling capacity, since it contains contaminants such as dyes, lubricating oils, titanium dioxide, carbon black, among other elements that can interfere with the cross-linking of the polymer chain.

Therefore, the present invention shows the technical and economic feasibility of producing superabsorbent polymers, starting from the PAN of textile application, recycled acrylic fibres and fabrics, by a simpler and more direct route, which makes it distinct from the others.

BRIEF DESCRIPTION OF THE INVENTION

The present invention discloses a process for producing superabsorbent polymer starting from textile polyacrylonitrile, recycled from fabrics with different mixtures of fibres or losses from the acrylic fiber manufacturing process as a result of spinning releases, substandard products and leftovers comprising the following steps:

Step 1—recovering the PAN from fabrics or manufacturing process losses,

Step 2—preparing a paste-like mixture of PAN with alkali hydroxides,

Step 3—obtaining the superabsorbent polymer by introducing the mixture into an autoclave with vapour under pressure, Step 4—drying the superabsorbent polymer, Step 5—milling the superabsorbent polymer, Step 6—recovering the ammonia from the hydrolysis vapour.

These process losses represent 1 to 5% of the production of plants that employ wet or dry spinning technologies.

BRIEF DESCRIPTION OF THE FIGURES

In order to obtain a total and complete visualization of the object of this invention, the figures to which references are made are presented, as follows.

DETAILED DESCRIPTION OF THE INVENTION

In order to better define the scope of the invention, the following definitions will be presented. It should be noted that these should not be interpreted in a limiting way, but with the purpose of describing their general principles.

The expression "superabsorbent polymer" means a cross-linked polymer, capable of absorbing and retaining large amounts of liquid in relation to its mass.

An acrylic fabric, as defined by the invention, consists of a textile material produced from threads or synthetic fibres using the polyacrylonitrile polymer, and which includes acrylic and modacrylic fibres, with a polyacrylonitrile content greater than or equal to 60%. In its turn, a polyacrylonitrile polymer in the context of the invention can be homopolymerized or copolymerized with other comonomers up to 40%, with for example vinyl acetate, methacrylonitrile, methyl acrylate, methyl methacrylate, acrylamide, itaconic acid, styrene, vinyl, vinylidene chloride and sodium methallylsulfonate.

Figure 1:
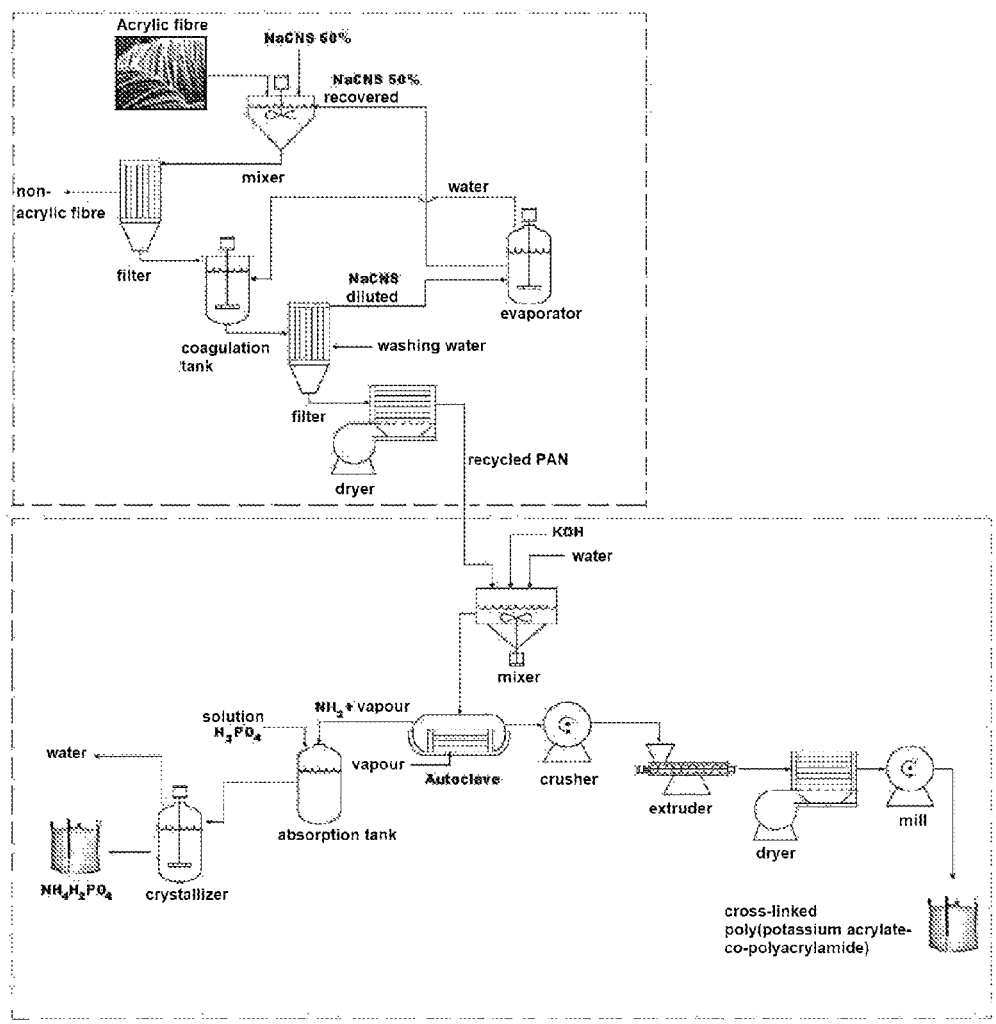
FIG. 1 refers to the flowchart of the steps of the acrylic fiber recycling process and the manufacture of superabsorbent polymer.
Figure 6:
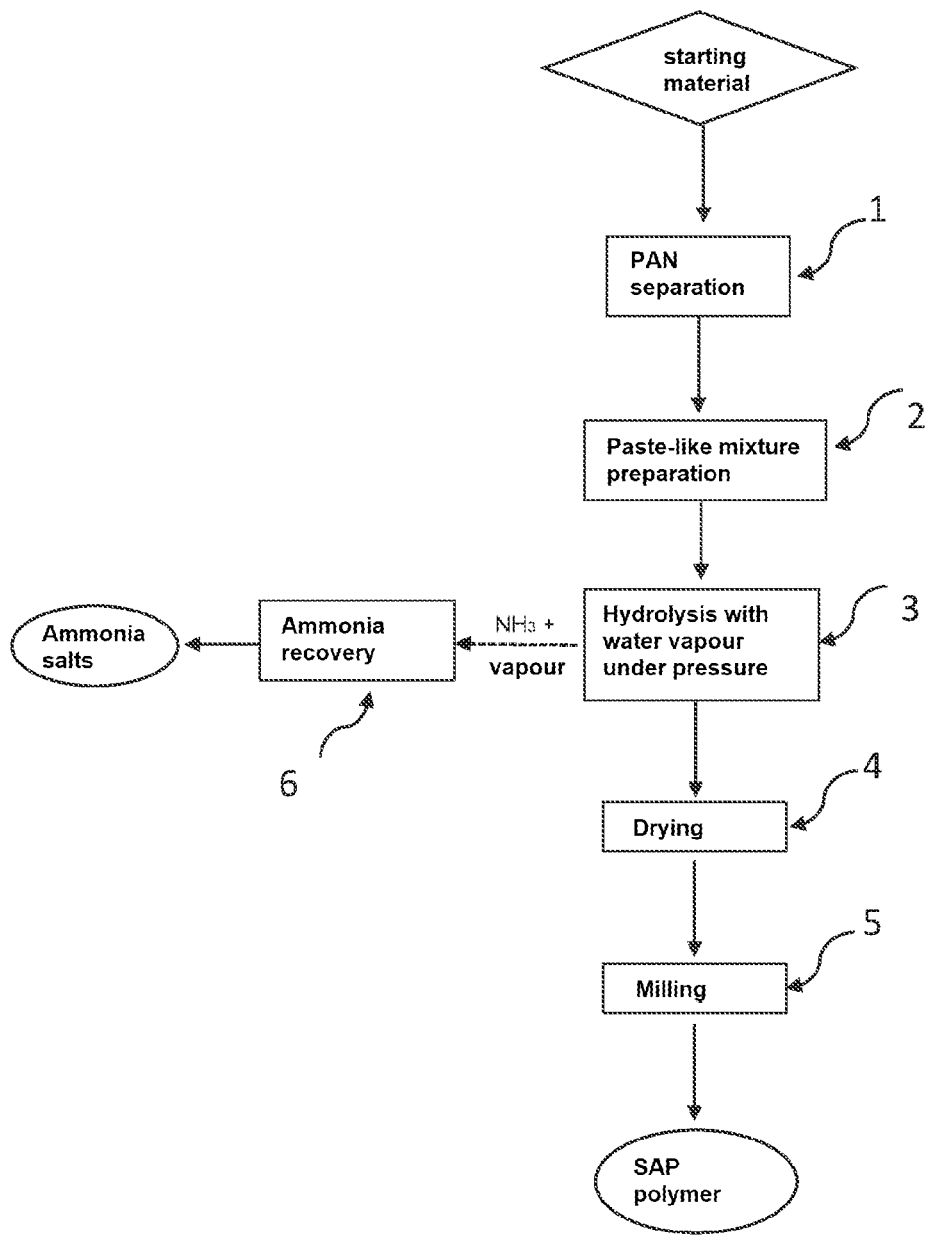
FIG. 6 illustrates the process contemplating the steps in a macro way.

As seen in FIGS. 1 and 6, the present invention is characterized by a process for producing a hydrogel-forming cross-linked superabsorbent polymer starting from recycled polyacrylonitrile from fabrics with different blends of fibres or of losses in the acrylic fiber manufacturing process as a result of spinning launches, substandard products and leftovers.

This process has the following steps:
a) Step 1—recovering the polyacrylonitrile (PAN) from fabrics or manufacturing process losses;
b) Step 2—preparing a paste-like mixture of PAN with alkaline hydroxides;
c) Step 3—obtaining the superabsorbent polymer by introducing the paste-like mixture into an autoclave with water vapour under pressure;
d) Step 4—drying the superabsorbent polymer;
e) Step 5—milling the superabsorbent polymer;
f) Step 6—recovering the ammonia from the hydrolysis vapour.

For better detailing of the previous steps, each one will be properly discussed and explained.

Step 1—Recovering PAN from Acrylic Fabrics or Losses from Manufacturing Process

Step 1 as shown at the top of FIG. 1, consists of the recovery of PAN from acrylic fabrics or losses from manufacturing process. Physical processes based on different fibre properties, such as density, are impractical because they are entangled. The acrylic yarns found on the market currently used in clothing are almost entirely blended with cotton, polyamide, viscose, polyester or wool.

Dimethylformamide (DMF) or dimethylacetamide (DMAc) which are the most common solvents for PAN do not dissolve cotton or wool, but attack polyester and polyamide fibres. To carry out this invention, it was found that the least aggressive solvent for the other types of fibres is sodium thiocyanate (NaCNS) solution. At a concentration of 50% (M/M) NaCNS easily dissolves the PAN under heating, keeping the other fibres intact, thus being able to use it to produce solutions within an adequate range of viscosity up to 20% of dissolved PAN. This solution, when added to a water bath under agitation, coagulates the PAN again in the form of flakes, which can be washed, dried at 105° C. until moisture content <2%, milled and classified in a sieve <300 μm. Under these conditions the PAN powder can be subjected to hydrolysis just like a newly produced polymer. It should be noted that other compounds can be used instead of sodium thiocyanate, such as 60% zinc chloride solution, potassium thiocyanate, ammonium thiocyanate, glycerin carbonate, among other substances.

It was found during several hydrolysis tests that pure acrylic fibres, without being dissolved with NaCNS, whether they come from finished fabrics or losses from manufacturing process, even ground, are very resistant to hydrolysis, providing polymers with a degree of swelling lower than 100 g $H_2O$/g. This can be explained by the high molecular orientation of the polymeric chain in the fibrillar structure due to the stretching process they undergo, to increase tenacity. Another factor that reduces the reactivity of acrylic fibres when subjected to direct hydrolysis with sodium or potassium hydroxide is the small surface area due to its monolithic structure and almost no porosity. PAN, when freshly precipitated by coagulation from its solutions in an aqueous bath, is easily hydrolyzed and results in polymers with a swelling degree >150 g $H_2O$/g.

Another important characteristic of PAN recovered from fabrics is its dark coloring, as the fibres are dyed, but even in this form, most dyes are decomposed during hydrolysis resulting in a final cross-linked yellow colored polymer, with production of colorless hydrogel when swollen.

Fibres from different manufacturers have a composition difference in terms of the type of comonomer used (used to give the fiber dyeing affinity, since the homopolymer fibre does not absorb dye) and also its concentration. The most used comonomers are vinyl acetate, methyl acrylate and sodium methallyl sulfonate, being used in the range of 4 to 8% in most producers. But other types are used less frequently in specialty fibres such as acrylamide, methacrylonitrile, methyl methacrylate, itaconic acid, styrene, vinyl chloride and vinylidene chloride.

Since commercial acrylic fibres are relatively standardized in terms of title (thickness) and chemical composition to produce the same dyeing activity during the dyeing process, only major brands were tested in this invention, but it can be applied to any type of fiber containing polyacrylonitrile.

The PAN recovered from acrylic fabrics containing fibres of the brands Crylor® and Raditek AC-60® (Radicifibras Brasil), Dralon® (Dralon Germany), Acryluna® (AKSA Turkey), Fisivon® (Fisipe Portugal) and Vonnel® (Mitsubishi Japan) resulted in polymers with a degree of swelling with distilled water from 150 to 800 g of $H_2O/g$ and a soluble fraction less than 2%. This proves the viability of the PAN solubilization process using 50% sodium thiocyanate (NaCNS) solution.

Another very positive aspect of the use of 50% sodium thiocyanate is its low environmental and occupational toxicity when compared to DMF and DMAc, in addition to being totally recycled after coagulation of the dissolved PAN, through a process of concentration by evaporation of water, since which is not volatile. On the other hand, DMF and DMAc solvents can only be recycled after PAN coagulation, by a complex fractional distillation system, as they form azeotropic mixtures with water, but yet the recovery is never complete and there are liquid and gaseous wastes that need to be treated by being toxic.

Considering the costs of the PAN recycling process from acrylic fabrics and the recovery of 50% sodium thiocyanate, it is possible to obtain a polymer for transformation into SAP at a cost of US$0.30/kg.

Obviously the yellowish or orange color of the superabsorbent polymer obtained with recycled PAN makes it difficult to use in personal care articles, but it can be used without any problem in agriculture and other less rigorous purposes in terms of color.

Step 2—Preparing the Paste-Like Mixture of PAN with Hydroxides

As shown in FIG. 1 at the top, recycled PAN from acrylic fibres or fabrics with moisture content <2% and granulometry <300 μm was obtained, it is mixed with an amount of potassium hydroxide or sodium hydroxide powder to form a semi-solid slurry in the molar ratio of PAN/OH$^-$ from 1:0.5 to 1:0.95, according to the PAN content in the recycled polymer obtained.

It should be noted that the granulometry and humidity conditions are illustrative. The PAN sample can be obtained with 0% moisture up to 50% and/or as particulate in the nanometer to mm range. It is all just a matter of process setting.

The PAN content in the polymer can be determined by infrared spectrophotometry method based on the intensity of the vibrational mode of the band at 2.240 cm$^{-1}$ referring to the nitrile group (CN) and the band 1.720 cm$^{-1}$ referring to the carboxyl group (CO) from the comonomer used.

After determining the amount of sodium or potassium hydroxide to be used in the hydrolysis of PAN, the solids are mixed in a planetary shaker for 15 minutes. It should be noted that the process can be adjusted with 10, 20, 30 or 60 min as required by the process. After this mixing time, water is slowly added until a paste-like consistency is obtained.

It is important that during the addition of water, the agitator is cooled due to the release of heat by the exothermic dissolution between the hydroxides and the water. The amount of water in the paste can vary according to the granulometry obtained in the milling process and the type of copolymer, but it is between 20% and 50% of the total mass obtained. When the paste is homogeneous, it can be transferred to silicone molds or stainless steel trays coated with non-stick film.

Step 3—Obtaining the Superabsorbent Polymer by Introducing the Paste Mixture into an Autoclave with Vapour Under Pressure As can be seen in the lower part of FIG. 1, the PAN paste prepared according to the previous item is transferred to a suitable mold, and taken to an autoclave which is then closed. Water vapour must be continuously passed through the autoclave to maintain an initial pressure of 1 kgf/cm$^2$ at the beginning of the hydrolysis, reaching up to 5 kgf/cm$^2$ at the end for drying. The water vapour in the autoclave atmosphere prevents the PAN oxidation and exothermic chain cyclization, which could lead to the formation of very rigid and inelastic cross-links, with little expansion capacity when hydrated. The hydrolysis and cross-linking time can vary from 3 to 5 hours, considering that the reaction is completed when there is no ammonia present in the entrained water vapour. For this verification, the pH of the condensed vapour is determined and if it is below 8 it indicates that the reaction is complete.

According to FIGS. 1 and 6, in step 6 it is important that all the water vapour leaving the autoclave is bubbled into a tank with a solution of phosphoric acid, nitric acid or sulfuric acid to absorb the ammonia gas ($NH_3$) released by the hydrolysis reaction. The ammonium salts formed in this solution can be used in agriculture as nitrogen fertilizers.

Figure 2:
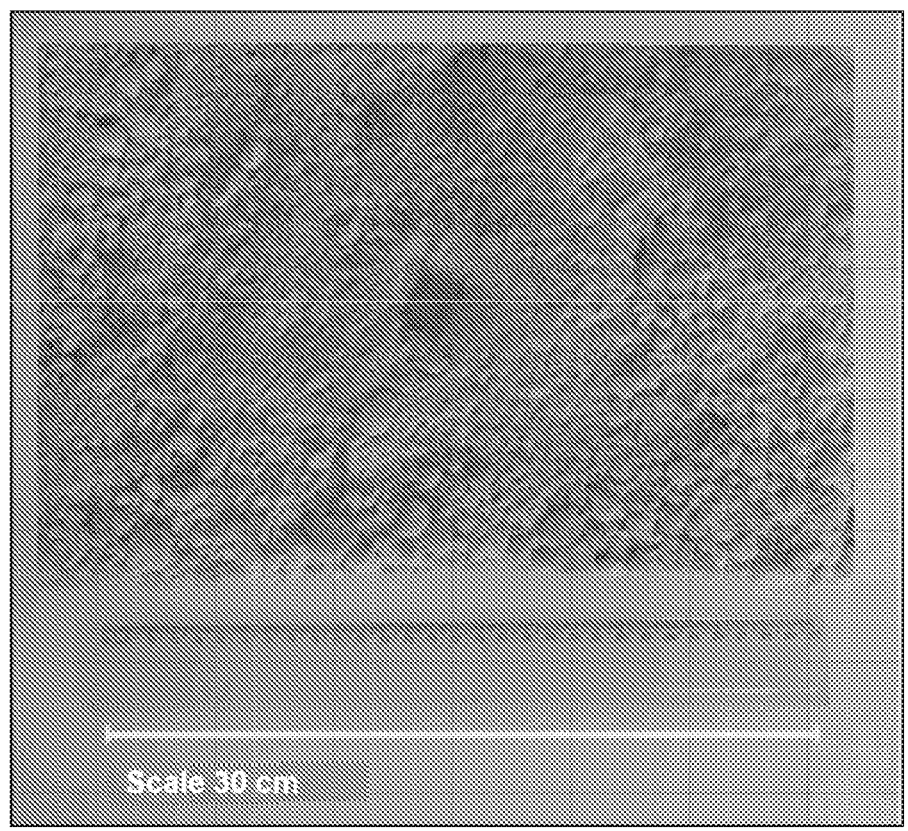
FIG. 2 refers to the superabsorbent polymer after exiting the autoclave in the cross-linked poly(potassium acrylate-co-acrylamide) form.
Figure 3:
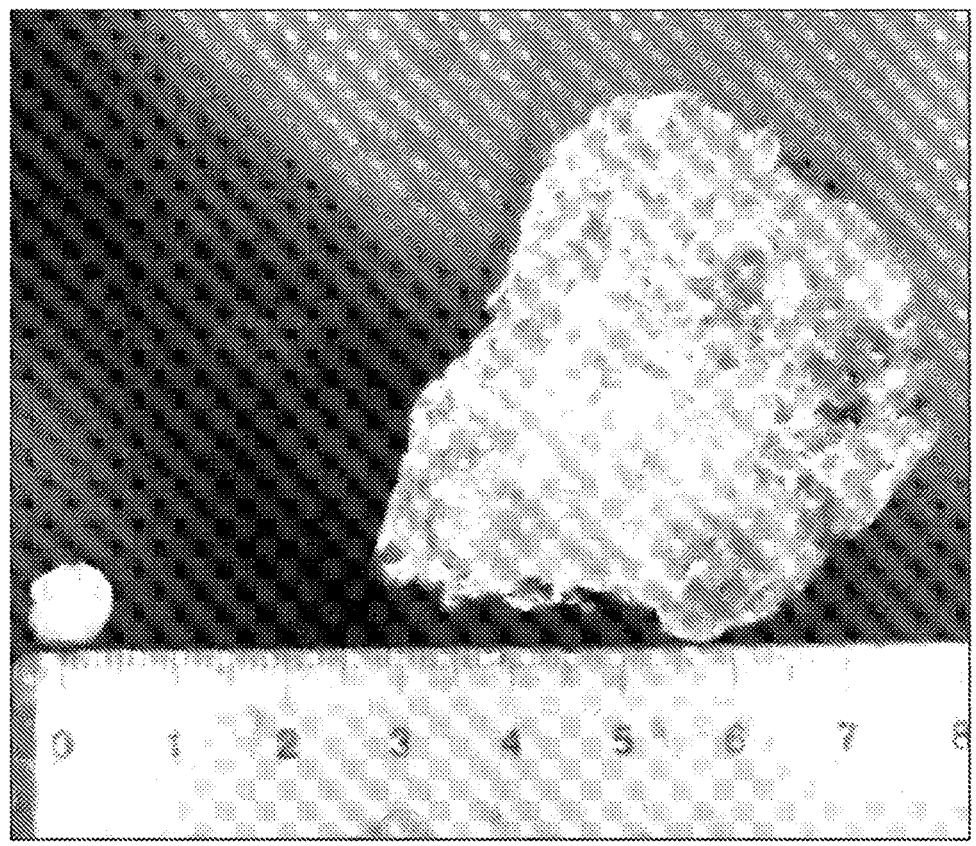
FIG. 3 depicts the cross-linked poly(potassium acrylate-co-acrylamide) after exiting autoclave, before and after swelling with water.

The cross-linked superabsorbent polymer, which is removed from the autoclave, is in solid form, yellow or orange, with a water content of 20 to 35%, as shown in FIG. 2, since part of the water is consumed by the reaction or evaporated inside the autoclave itself during the final phase when the temperature can reach 158° C. with vapour at 5 kgf/cm$^2$. Its swelling capacity is greater than 150 g $H_2O/g$ as shown in FIG. 3. Under the conditions described in this invention, the degree of hydrolysis of the nitrile nitrogen of the PAN is around 50% to 65%, resulting in a copolymer consisting of a chain formed by polyacrylate-co-polyacrylamide, and the cross-linking agents are derived from the hydrolyzed nitrile nitrogen itself, probably by the formation of β-diketone groups that are very stable in the reaction medium.

Figure 5:
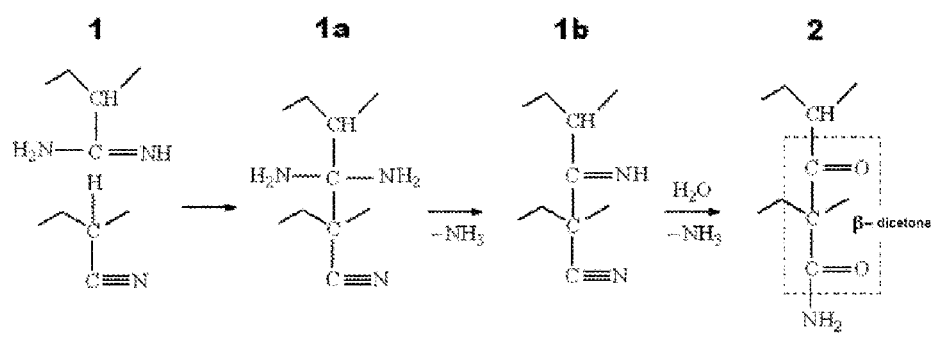
FIG. 5 presents the equation that shows the steps of hydrolysis and cross-link formation in the PAN chain.

As can be seen in FIG. 5 in structure 1, the amidine chain formed during the condensation process can interact with the α-H of another PAN chain, forming the unstable intermediate 1a, which by releasing ammonia forms the intermediate 1b, which by releasing another molecule of water and ammonia, forms structure 2 containing the β-diketone group, responsible for the stability of the cross-linking between the polymer chains.

Figure 4:
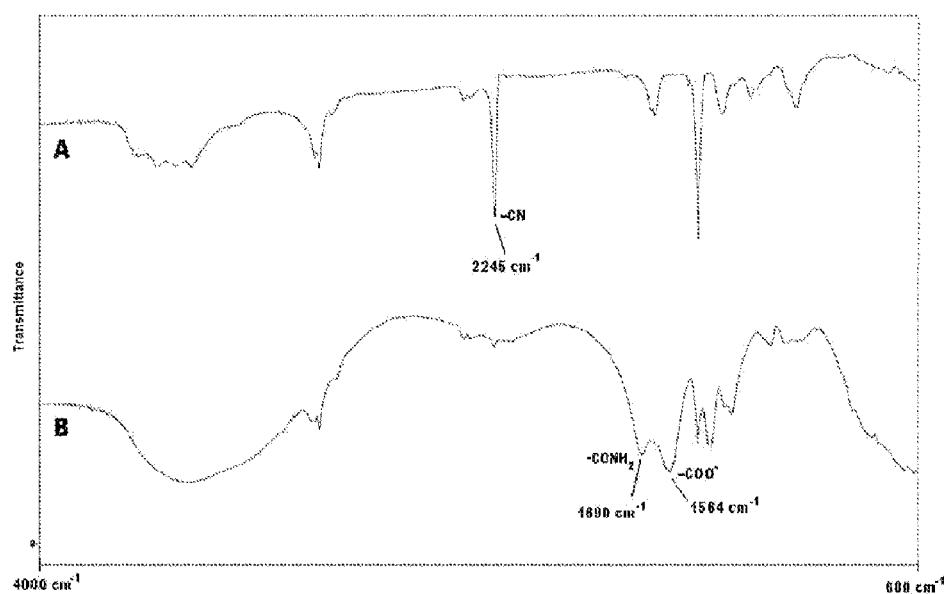
FIG. 4 demonstrates the comparison of infrared spectra (FTIR): In Spectrum A, the PAN obtained from recycling the homopolymeric Raditek AC-60 fiber before hydrolysis. In Spectrum B, the superabsorbent polymer obtained after hydrolysis.

The monitoring of the PAN hydrolysis process can be performed by infrared spectrophotometry monitoring the strong intensity band 2.245 cm$^{-1}$ referring to the vibrational mode of the —CN grouping. As the hydrolysis proceeds, this band decreases and the bands of 1.675 cm$^{-1}$ and 1.572 cm$^{-1}$ referring to the vibrational modes of the amide (—$CONH_2$) and carboxylate (—COO—) grouping increase in intensity. When the hydrolysis is complete, the 2.245 cm$^{-1}$ band is completely absent, which is the desired condition for the process, as shown in FIG. 4. It should be noted that the spectra of acrylic fibres from other manufacturers are all the same and present the same bands in the same regions. The AC-60 fiber was chosen for exemplary purposes, as it is homopolymeric (100% PAN) and demonstrates that after hydrolysis the nitrile is completely converted into acrylate and amide. In other words, nitrile fibres from other manufacturers behave in the same way.

Chemically, the hydrogel-forming copolymer obtained when sodium hydroxide is used in the hydrolysis is the cross-linked poly(sodium acrylate-co-acrylamide) and by the use of potassium hydroxide, the cross-linked poly(potassium acrylate-co-acrylate) is produced.

Due to the degree of cross-linking and insolubility in water, it is considered that the molecular weight of this polymer tends to infinity, and a particle of 50 mg can have a molecular weight in the order of $3 \times 10^{13}$ gigadaltons.

When the molar ratio of hydroxide is greater than 0.95 in relation to PAN, the degree of hydrolysis increases, causing the nitrogen of the β-diketone bonds responsible for the cross-links to be converted into ammonia, which results in rather than a superabsorbent polymer, a fully water-soluble product, basically consisting of a low molecular weight polyacrylate-co-polyacrylamide chain. On the other hand, if the hydrolysis molar ratio is less than 0.5 in relation to PAN, few hydrophilic groups such as carboxylates and amides are formed, which leaves the degree of swelling very small and the hydrogel produced with a brown or orange color.

It can be verified in this invention that by controlling the hydrolysis conditions and its degree, a product is obtained practically ready in the autoclave and in a different way from the methods of the patents mentioned above in the state of the art section, considering that in this invention, there is no use of a reactor with mechanical agitation during the hydrolysis step, there is no addition of grafting agents, there is no addition of cross-linking agents and it is not necessary to precipitate the polymer from the reaction medium with acids or solvents.

For superabsorbent polymer for agricultural applications, potassium hydroxide should be used in hydrolysis, since this element is a macronutrient for plants and during its biodegradation, it becomes available to plants.

Chemical analyzes performed on recycled polymers from Crylor® acrylic fibres containing 6% polyvinyl acetate, performed by inductively coupled plasma atomic emission spectrophotometry (ICP-AES) and combustion analysis (CHN) showed potassium content between 24% to 26% and nitrogen from 9% to 11%, which indicates excellent potential for this type of application. For other non-agricultural applications, sodium hydroxide is more recommended, as its market price is lower than potassium hydroxide.

Step 4—Drying the Superabsorbent Polymer

The superabsorbent polymer comes out of the autoclave practically ready in solid form with a moisture content between 20% and 35% (FIG. 2), and can be used as it is, if necessary, simply by breaking it into the desired shape and size. But for a more efficient milling in a micronizer mill, it is necessary to reduce its humidity below 8%, when it presents adequate mechanical properties for micronization and granulometric classification. To facilitate the drying of the polymer, they must be fragmented into strips of approximately 2 cm in width, which can be achieved using a shredder. The fragments obtained in the shredder can be fed into an extruder with 5 mm holes and transformed into semi-continuous filaments. In this form the filaments are transferred to a belt oven and dried continuously between 105° C. and 120° C. until a moisture content below 8%, when the polymer becomes brittle and easy to grind. Note that other forms can be used for drying at temperatures up to 200° C. Other types of ovens can be used for drying such as microwave ovens, spray dry, etc. with moisture contents that do not necessarily have to be less than 8%.

Step 5—Milling the Superabsorbent Polymer

After drying, the milling step is carried out in a micronizer mill coupled with vibrating sieves for the granulometric classification of the polymer. Milling must be carried out in a room with humidity control so that it is below 30% to prevent the polymer from absorbing atmospheric moisture and agglomerating, resulting in clogging of the classification sieves screens.

After carrying out the steps described, the polymers produced from recycled PAN from acrylic fibres and fabrics meet all the properties necessary to be used in any application that requires this type of substance. Other types of mills can be used (by way of non-exhaustive examples: cutting mill, hammer mill, ball mill, among others). In the same way, also several sorting systems with sieves, air, magnetic can be used in this step.

Step 6—Recovering Ammonia from the Hydrolysis Vapour

An important by-product formed in the alkaline hydrolysis process is ammonia, which is carried away with the water vapour leaving the autoclave. For economic reasons due to its added value and potential application in the agricultural market as a fertilizer, ammonia is easily converted into any ammonium salt, such as ammonium sulfate, ammonium phosphate or ammonium nitrate. For this, the vapour with ammonia must be bubbled in a solution of the respective acids inside an absorption tank, until neutralization, which is easily determined by measuring the pH of the solution. Once neutralized, the solution in the tank can be transferred to a vacuum crystallizer and obtained the ammonium salt by evaporation of water or market this solution directly for fertigation. Considering a degree of hydrolysis of 60%, it is possible to produce 191 kg of $NH_3$ per ton of PAN, which will result in 1.18 tons of ammonium monohydrogen phosphate fertilizer ($NH_4H_2PO_4$), known as MAP, or 0.74 ton ammonium sulfate [$(NH_4)_2SO_4$].

EXAMPLES

The present invention will now be described and explained in more detail by way of examples. It should be understood that the present invention is not to be limited to the examples described herein.

To carry out the examples, the following equipment was used:
- rotary knife mill, type Wyley, trademark Tecnal®
- high rotation mixer of 50 L trademark Max Machine®
- vacuum filtration system with funnel of 5 L Millipore®
- planetary mixer Bps-05 trademark Skymsen®
- pump Masterflex® L/S
- extruder Pastaia 6 Italvisa®
- shredder trademark Soyo®
- stainless steel vertical autoclave of 150 L Mecamau®
- oven Fanem® model 320-SE
- GPC chromatograph trademark Waters® model 2414
- spectrophotometer ICP-AES Perkin-Elmer® model 7300DV
- spectrophotometer FTIR Varian® 640 IR
- analyzer CHN Perkin-Elmer® 2400
- automatic titrator Metrohm® 751GDP Titrino
- moisture balance Mettler-Toledo® HE53
- analytical balance Shimadzu® AY220

Example 1

Approximately 5.0 kg of acrylic fabric in the form of a blanket, with yellow color, containing 85% of acrylic fiber Crylor® and 15% of cotton fiber, were ground in a rotary knife mill at 1500 rpm to produce fragments smaller than 1 mm long. This ground fiber was added to 20 kg of 50% sodium thiocyanate solution and heated with stirring to 80° C. After dissolution of the acrylic fiber, the viscous solution was filtered to separate the cotton fiber and immediately added with the aid of a pump at a flow rate of 500 mL/min in a 50 L high-speed mixer containing 20 L of water.

After the addition of the acrylic fiber solution, the precipitated polymer was ground for 20 minutes, vacuum filtered and washed with demineralized water until drops of 1% ferric chloride solution did not produce a reddish color with the wet polymer, being tolerated at most slightly pink color. Since ferric chloride reacts with the thiocyanate anion producing an intense red color, this reagent was used to control the quality of the polymer wash. The recycled polymer after washing was dried in air flow at 105° C. until the moisture content was below 2%. After this step, the dry polymer was ground in a rotary knife mill and the fraction <300 μm was obtained. This recycled polymer was analyzed on a 3-column GPC chromatograph PLGel-10 μm mixed B at 70° C. with 0.01M DMF-LiBr mobile phase and showed Mw 147.3 kD and Mn 52.3 kD. The polyvinyl acetate content in this polymer was analyzed by a distillation method employing hydrolysis with phosphoric acid and potentiometrically titrating the acetic acid released with 0.1 N sodium hydroxide solution. Under these conditions, this polymer had a polyvinyl acetate content of 5.85% and a PAN of 94.15%. The moisture content analyzed by gravimetry at 105° C. was 0.45%. About 3.00 kg of this polymer or 53.29 moles of PAN was added in a jacketed pan planetary mixer, along with 2.40 kg of 90% KOH powder or 38.47 moles, giving a molar ratio of PAN:KOH of 1:0.72.

The mixture was made for 10 minutes and then, slowly and passing ice water in the pan jacket, 1.9 kg of water were added in 100 mL portions, always trying to keep the temperature below 40° C. After 10 minutes of mixing, the paste-like mass was transferred to teflon-coated stainless steel molds measuring 30 cm×40 cm×10 cm and taken to a 150 L vertical stainless steel autoclave. Immediately the introduction of water vapour began and the pressure of 1 kgf/cm$^2$ was maintained for 30 minutes. After this time, the pressure was increased to 3 kgf/cm$^2$ and maintained for 150 minutes. After this time, the pressure was raised to 5 kgf/cm$^2$ for 60 minutes, resulting in a total time of 4 hours. During the entire time of hydrolysis and pre-drying of the polymer, the excess vapour with the ammonia was absorbed in 20 L 30% phosphoric acid solution. By analyzing the residual acidity of the solution in an automatic titrator with sodium hydroxide, a degree of PAN hydrolysis of 56.8% was indicated.

The polymer obtained showed light yellow and flexible placement with a moisture content of 27.8%. It was reduced to 2 cm wide by 40 cm long strips using a shredder crusher and then dried for 12 hours at 105° C. in an oven. Milling was carried out in a rotary knife mill at 1500 rpm equipped with a 1 mm screen. It showed the following characteristics: light yellow powder; humidity: 6.7%; potassium content: 24.42%; nitrogen content: 10.30%; degree of swelling with distilled water when leaving the autoclave: 315 g/g; degree of swelling with distilled water after drying: 423 g/g; degree of swelling with 0.9% NaCl after drying: 52 g/g; soluble fraction content: 1.2%; pH at 25° C. of ungelled water at a concentration of 2 g/L: 7.35. Dry polymer yield: 5.22 kg.

Example 2

Approximately 4.5 kg of fiber in coil format, with light blue color, containing 70% of acrylic fiber Dralon®, 15% of cotton fiber and 15% of wool were ground in a rotary knife mill at 1500 rpm to produce fragments smaller than 1 mm in length. This ground fiber was added to 20 kg of 50% sodium thiocyanate solution and heated with stirring to 85° C. After dissolution of the acrylic fiber, the viscous solution was filtered to separate the cotton and wool fiber. It was immediately added with the aid of a pump at a flow rate of 500 mL/min in a 50 L high-speed mixer containing 20 L of water. After finishing the addition of the acrylic fiber solution, the precipitated polymer was ground for 20 minutes, vacuum filtered and washed with demineralized water until negative reaction with the 1% ferric chloride solution.

The recycled polymer after washing was dried in air flow at 105° C. until the moisture content was below 2%. After this step, the dry polymer was ground in a rotary knife mill and the fraction <300 μm was obtained. This recycled polymer was analyzed in a GPC chromatograph with 3 PLGel-10 μm mixed B columns at 70° C. with 0.01M DMF-LiBr mobile phase and showed Mw 168.9 kD and Mn 56.7 kD. The polyvinyl acetate content in this polymer was analyzed by a distillation method employing hydrolysis with phosphoric acid and titrating the liberated acetic acid with 0.1 N sodium hydroxide solution. Under these conditions, this polymer had a polyvinyl acetate content of 4.89% and a PAN of 95.11%. The moisture content analyzed by gravimetry at 105° C. was 0.68%. About 3.00 kg of this polymer or 53.83 moles of PAN was added in a jacketed pan planetary mixer, along with 1.50 kg of 99% NaOH powder or 37.12 moles, giving a molar ratio of PAN:NaOH of 1:0.69. The mixture was made for 10 minutes and then, slowly and with ice water passing through the pan jacket, 1.6 kg of water were added in 100 mL portions, always trying to keep the temperature below 40° C. After 10 minutes of mixing, the paste-like mass was transferred to teflon-coated stainless steel molds measuring 30 cm×40 cm×10 cm and taken to the vertical stainless steel autoclave. The introduction of water vapour was immediately started and the pressure was maintained at 1.5 kgf/cm$^2$ for 60 minutes. After this time, the pressure was increased to 3 kgf/cm$^2$ and maintained for 150 minutes. After this time, the pressure was raised to 5 kgf/cm$^2$ for 60 minutes, resulting in a total time of 4.5 hours. During the entire time of hydrolysis and pre-drying of the polymer, the excess vapour with the ammonia was absorbed in 20 L 30% sulfuric acid solution. The analysis of the residual acidity of the solution by titration with sodium hydroxide indicated a degree of hydrolysis of the PAN of 59.4%.

The polymer obtained showed orange placement, being flexible, with a moisture content of 25.9%. It was reduced to filaments using an extruder with 1 cm holes and then dried for 12 hours at 105° C. Milling was carried out in a knife mill at 1500 rpm equipped with a 1 mm screen. It has the following features:—light orange powder; humidity: 5.1%; sodium content: 10.15%; nitrogen content: 9.35%; degree of swelling with distilled water when leaving the autoclave: 329 g/g; degree of swelling with distilled water after drying: 458 g/g; degree of swelling with 0.9% NaCl after drying: 49 g/g; soluble fraction content: 1.8%; pH at 25° C. of ungelled water at a concentration of 2 g/L: 7.73; dry polymer yield: 4.88 kg.

Example 3

Approximately 3.0 kg of fiber filter cloth Raditek AC-60®, white color with 100% homopolymeric acrylic fiber, were ground in a rotary knife mill at 1500 rpm to produce fragments smaller than 1 mm in length. This ground fiber was added to 20 kg of 50% sodium thiocyanate solution and heated with stirring to 85° C. After dissolution of the acrylic fiber, the viscous solution did not need to be filtered, as it dissolved completely. It was immediately added with the aid of a pump at a flow rate of 500 mL/min in a 50 L high-speed mixer containing 20 L of water. After finishing the addition of the acrylic fiber solution, the precipitated polymer was ground for 20 minutes, vacuum filtered and washed with demineralized water until negative reaction with the 1% ferric chloride solution. The recycled polymer after washing was dried in air flow at 105° C. until the moisture content was below 2%. After this step, the dry polymer was ground in a rotary knife mill and the fraction <300 μm was obtained. This recycled polymer was analyzed in a GPC chromatograph with 3 PLGel-10 μm mixed B columns at 70° C. with 0.01M DMF-LiBr mobile phase and showed Mw 278.4 kD and Mn 89.3 kD. FTIR analysis of the polymer indicated that it contained 100% PAN due to the absence of the 1.720 cm$^{-1}$ band from comonomers. The moisture content analyzed by gravimetry at 105° C. was 0.52%. About 2.5 kg of this polymer or 47.17 moles of PAN was added in a jacketed pan planetary mixer, along with 1.53 kg of 99% NaOH powder or 37.86 moles, giving a molar ratio of PAN:NaOH of 1:0.80. The mixture was made for 10 minutes and then, slowly and with ice water passing through the pan jacket, 1.85 kg of water were added in 100 mL portions, always trying to keep the temperature below 40° C. After 10 minutes of mixing, the paste-like mass was transferred to teflon-coated stainless steel molds measuring 30 cm×40 cm×10 cm and taken to the vertical stainless steel autoclave. The introduction of water vapour was immediately started and the pressure was maintained at 1.0 kgf/cm$^2$ for 60 minutes. After this time, the pressure was increased to 3 kgf/cm$^2$ and maintained for 180 minutes. At the end of this time, the pressure was raised to 5 kgf/cm$^2$ for 60 minutes, resulting in a total time of 5 hours. During the entire time of hydrolysis and pre-drying of the polymer, the excess vapour with the ammonia was absorbed in 20 L of 30% sulfuric acid solution. By analyzing the residual acidity of the solution by titration with sodium hydroxide, a degree of PAN hydrolysis of 53.2% was indicated. The polymer obtained showed orange and flexible placement with a moisture content of 27.3%. It was reduced to filaments using an extruder with 1 cm holes and then dried for 12 hours at 105° C. Milling was carried out in a knife mill at 1500 rpm equipped with a 1 mm screen. It presented the following characteristics: orange powder; humidity: 6.7%; sodium content: 11.38%; nitrogen content: 10.18%; degree of swelling with distilled water when leaving the autoclave: 452 g/g; degree of swelling with distilled water after drying: 610 g/g; degree of swelling with 0.9% NaCl after drying: 64 g/g; soluble fraction content: 1.6%; pH at 25° C. of non-gelled water at the concentration of 2 g/L: 7.05; dry polymer yield: 4.38 kg.

Example 4

Approximately 2.4 kg of acrylic fabric in the form of a blanket, with a green color, containing 70% of acrylic fiber Fisivon® together with 20% of viscose fiber and 10% of polyamide fiber were ground in a rotary knife mill at 1500 rpm to produce fragments smaller than 1 mm in length. This ground fiber was added to 20 kg of 50% sodium thiocyanate solution and heated with stirring to 80° C. After dissolution of the acrylic fiber, the viscous solution was filtered to separate the cotton and wool fiber. It was immediately added with the aid of a pump at a flow rate of 500 mL/min in a 50 L high-speed mixer containing 20 L of water. After finishing the addition of the acrylic fiber solution, the precipitated polymer was ground for 20 minutes, vacuum filtered and washed with demineralized water until negative reaction with the 1% ferric chloride solution. The recycled polymer after washing was dried in air flow at 105° C. until the moisture content was below 2%. After this step, the dry polymer was ground in a rotary knife mill and the fraction <300 μm was obtained. This recycled polymer was analyzed in a GPC chromatograph with 3 PLGel-10 μm columns mixed B at 70° C. with 0.01 M DMF-LiBr mobile phase and showed Mw 151.9 kD and Mn 52.3 kD. The polyvinyl acetate content in this polymer was analyzed by a distillation method employing hydrolysis with phosphoric acid and potentiometrically titrating the acetic acid released with 0.1 N sodium hydroxide solution. Under these conditions, this polymer had a polyvinyl acetate content of 4.98% and a PAN of 95.02%. The moisture content analyzed by gravimetry at 105° C. was 1.5%. About 1.50 kg of this polymer or 26.89 moles of PAN was added in a jacketed pan planetary mixer, along with 0.85 kg of 99% NaOH powder or 21.03 moles, giving a molar ratio of PAN:NaOH of 1:0.78. The mixture was mixed for 10 minutes and then, slowly, passing ice water through the pan jacket, 0.85 kg of water were added in 100 mL portions, always trying to keep the temperature below 40° C. After 10 minutes of mixing, the paste-like mass was transferred to teflon-coated stainless steel molds measuring 30 cm×40 cm×10 cm and taken to the vertical stainless steel autoclave. The introduction of water vapour was immediately started and the pressure was maintained at 1.5 kgf/cm$^2$ for 60 minutes. After this time, the pressure was increased to 2.5 kgf/cm$^2$ and maintained for 120 minutes. After this time, the pressure was raised to 5 kgf/cm$^2$ for 30 minutes, resulting in a total time of 3.5 hours. During the entire time of hydrolysis and pre-drying of the polymer, the excess vapour with the ammonia was absorbed in 20 L 30% sulfuric acid solution. The analysis of the residual acidity of the solution by titration with sodium hydroxide indicated a degree of hydrolysis of the PAN of 55.1%.

The polymer obtained showed orange and flexible placement with a moisture content of 24.7%. It was reduced to filaments using an extruder with 1 cm holes and then dried for 12 hours at 105° C. Milling was carried out in a knife mill at 1500 rpm equipped with a 1 mm screen. It has the following features:—light yellow powder; humidity: 4.3%; sodium content: 10.01%; nitrogen content: 9.18%; degree of swelling with distilled water when leaving the autoclave: 329 g/g; degree of swelling with distilled water after drying: 432 g/g; swelling degree with 0.9% NaCl after drying: 44 g/g; soluble fraction content: 1.3%; pH at 25° C. of ungelled water at a concentration of 2 g/L: 7.68; dry polymer yield: 2.41 kg.

Example 5

Approximately 6.3 kg of fiber Crylor® type T-98 wet spinning waste, obtained with a copolymer containing polyvinyl acetate, with a filament diameter of 10 to 60 μm, were ground in a rotary knife mill at 1500 rpm to produce fragments smaller than 1 mm in length. This ground fiber was added to 35 kg of 50% sodium thiocyanate solution and heated with stirring to 80° C. After dissolution of the acrylic fiber, the viscous solution was filtered to remove insoluble residue. Then it was added with the aid of a pump at a flow rate of 500 mL/min in a 50 L high-speed mixer containing 30 L of water. After the addition of the acrylic fiber solution, the precipitated polymer was ground for 20 minutes, filtered under vacuum and washed with demineralized water until negative reaction with the 1% ferric chloride solution. The recycled polymer after washing was dried in air flow at 105° C. until the moisture content was below 2%. After this step, the dry polymer was ground in a rotary knife mill and the fraction <300 μm was obtained. This recycled polymer was analyzed in a GPC chromatograph with 3 PLGel-10 μm mixed B columns at 70° C. with 0.01 M DMF-LiBr mobile phase and showed Mw 146.7 kD and Mn 22.1 kD. The polyvinyl acetate content in this polymer was analyzed by a distillation method employing hydrolysis with phosphoric acid and potentiometrically titrating the acetic acid released with 0.1 N sodium hydroxide solution. Under these conditions, this polymer had a polyvinyl acetate content of 5.70% and a PAN of 94.30%. The moisture content analyzed by gravimetry at 105° C. was 1.5%. Approximately 5.50 kg of this polymer or 97.85 moles of PAN was added in a jacketed pan planetary mixer, along with 2.23 kg of 99% NaOH powder or 55.75 moles, giving a molar ratio of PAN:NaOH of 1:0.57. The mixture was made for 10 minutes and then, slowly and with ice water passing through the pan jacket, 2.50 kg of water were added in 100 mL portions, always trying to keep the temperature below 40° C. After 10 minutes of mixing, the paste-like mass was transferred to teflon-coated stainless steel molds measuring 30 cm×40 cm×10 cm and taken to the vertical stainless steel autoclave. The introduction of water vapour was immediately started and the pressure was maintained at 1.0 kgf/cm$^2$ for 120 minutes. After this time, the pressure was increased to 3.5 kgf/cm$^2$ and maintained for 120 minutes. At the end of this time, the pressure was raised to 5 kgf/cm$^2$ for 60 minutes, resulting in a total time of 5 hours.

During the entire time of hydrolysis and pre-drying of the polymer, the excess vapour with ammonia was absorbed in 50 L 30% phosphoric acid solution. The analysis of the residual acidity of the solution by titration with sodium hydroxide indicated a degree of hydrolysis of the PAN of 58.5%. The polymer obtained showed a light yellow, flexible, spongy placement, with a moisture content of 31.2%. It was cut into 20 mm strips in the shredder and then dried for 30 minutes in a belt oven at 160° C. at a speed of 5 cm/min. Milling was carried out in a knife mill at 1500 rpm equipped with a 1 mm screen. It showed the following characteristics: light yellow powder; humidity: 6.1%; sodium content: 10.35%; nitrogen content: 8.80%; degree of swelling with distilled water when leaving the autoclave: 275 g/g; degree of swelling with distilled water after drying: 298 g/g; swelling degree with 0.9% NaCl after drying: 37 g/g; soluble fraction content: 1.9%; pH at 25° C. of ungelled water at a concentration of 2 g/L: 7.05; Dry polymer yield: 10.90 kg.

The invention claimed is:

1. A process for producing superabsorbent polymers using polyacrylonitrile recycled from acrylic fibres and fabrics, comprising:
    (1) obtaining or separating polyacrylonitrile from other fibres;
    (2) preparing a paste-like mixture of PAN with hydroxides;
    (3) introducing the paste-like mixture into an autoclave with water vapour under pressure generating the superabsorbent polymer by hydrolysis and a vapour;
    (4) drying the superabsorbent polymer;
    (5) milling the superabsorbent polymer; and
    (6) recovering ammonia from an acid hydrolysis vapour of the vapour generated in step (3).

2. The process according to claim 1, wherein step (3) involves an alkaline hydrolysis reaction of polyacrylonitrile with water vapour under pressure.

3. The process according to claim 2, wherein the alkaline hydrolysis in step (3) is carried out in the autoclave without a stirrer or any other mixing device.

4. The process according to claim 3, wherein the alkaline hydrolysis is carried out with water vapour up to a maximum pressure of 5 kgf/cm$^2$.

5. The process according to claim 3, wherein the hydrolysis and cross-linking of the superabsorbent polymer occurs in a single step in the autoclave.

6. The process according to claim 3, wherein the superabsorbent polymer has a swelling degree between 150 to 800 g H$_2$O/g after leaving the autoclave in step (3).

7. The process according to claim 1, wherein the formation of the paste-like mixture in step (2) comprises mixing the polyacrylonitrile with alkali metal hydroxides and water to undergo hydrolysis.

8. The process according to claim 7, wherein the alkali metal hydroxides employed in step (2) are selected from the group consisting of sodium, potassium and lithium hydroxides and mixtures thereof.

9. The process according to claim 7, wherein a molar ratio of polyacrylonitrile and alkali metal hydroxides is from 1:0.5 to 1:0.95.

10. The process according to claim 1, wherein the polyacrylonitrile separated or obtained in step (1) is virgin or recycled from acrylic fibres or fabrics.

11. The process according to claim 1, wherein the polyacrylonitrile separated or obtained in step (1) contains at least 60% of the acrylonitrile monomer (C$_3$H$_3$N).

12. The process according to claim 1, wherein in step (1) the polyacrylonitrile separated or obtained is homopolymerized or copolymerized up to 40% with vinyl acetate, methacrylonitrile, methyl acrylate, methyl methacrylate, acrylamide, itaconic acid, styrene, vinyl chloride, vinylidene chloride and sodium methallyl sulfonate.

13. The process according to claim 1, wherein the polyacrylonitrile has a molecular weight between 5×10$^4$ to 5×10$^6$ g/mol.

14. The process according to claim 1, wherein step (6) comprises treating water vapour and ammonia gas from step (3), in a tank with a solution of phosphoric acid, nitric acid or sulfuric acid, and transferring to a vacuum crystallizer and obtaining a salt.

* * * * *